United States Patent
Wu et al.

(10) Patent No.: US 10,444,622 B2
(45) Date of Patent: Oct. 15, 2019

(54) METHOD FOR GENERATING MASKS FOR MANUFACTURING OF A SEMICONDUCTOR STRUCTURE

(71) Applicant: UNITED MICROELECTRONICS CORP., Hsinchu (TW)

(72) Inventors: Tsung-Yeh Wu, Tainan (TW); Chia-Wei Huang, Kaohsiung (TW); Yung-Feng Cheng, Kaohsiung (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 83 days.

(21) Appl. No.: 15/892,935

(22) Filed: Feb. 9, 2018

(65) Prior Publication Data
US 2019/0250503 A1     Aug. 15, 2019

(51) Int. Cl.
| | | |
|---|---|---|
| G06F 17/50 | (2006.01) | |
| G03F 1/70 | (2012.01) | |
| G03F 7/20 | (2006.01) | |
| G03F 1/36 | (2012.01) | |

(52) U.S. Cl.
CPC .............. G03F 1/70 (2013.01); G03F 1/36 (2013.01); G03F 7/705 (2013.01); G03F 7/70441 (2013.01); G06F 17/5081 (2013.01); G06F 2217/12 (2013.01)

(58) Field of Classification Search
CPC ............. G06F 17/5072; G06F 17/5081; G06F 2217/12; G06F 17/5068; G03F 1/70; G03F 1/30; G03F 1/36; G03F 7/40441; G03F 7/705
See application file for complete search history.

(56) References Cited

U.S. PATENT DOCUMENTS

| | | |
|---|---|---|
| 7,266,801 B2 | 9/2007 | Kotani et al. |
| 8,111,921 B2 | 2/2012 | Hsu et al. |
| 2010/0175040 A1 | 7/2010 | Meiring et al. |
| 2014/0282287 A1* | 9/2014 | Hsu ..................... G06F 17/5081 716/51 |
| 2016/0042108 A1* | 2/2016 | Ho ...................... G06F 17/5072 716/55 |

* cited by examiner

*Primary Examiner* — Vuthe Siek
(74) *Attorney, Agent, or Firm* — WPAT, PC (57) ABSTRACT

A method for generating masks for manufacturing of a semiconductor structure includes the following steps. First, a design pattern is provided to a processor. The design pattern includes at least one first pattern and at least two second patterns shorter than the first pattern, wherein two of the second patterns are arranged in a line along an extending direction of the patterns. Then, the second patterns are elongated by the processor such that the two second patterns arranged in the line are separated from each other by a distance equal to a minimum space of the design pattern. The design pattern is divided into a first set of patterns and a second set of patterns by the processor. A first mask is generated by the processor based on the first set of patterns. A second mask is generated by the processor based on the second set of patterns.

7 Claims, 7 Drawing Sheets

METHOD FOR GENERATING MASKS FOR MANUFACTURING OF A SEMICONDUCTOR STRUCTURE

TECHNICAL FIELD

This disclosure relates to a method for processing a design pattern of structures in a semiconductor structure. More particularly, this disclosure relates to a method for generating masks for manufacturing of a semiconductor structure.

BACKGROUND

As the sizes and spaces of structures in a semiconductor structure decrease, it becomes harder to form the structures arranged densely in parallel. One of the reasons is the resolution limitation of lithography processes. To solve this problem, multiple patterning technologies, such as double patterning technology, are proposed. An example is pitch splitting. The structures arranged densely in parallel are divided into two interleaving sets, and the two sets of the structures are formed using two separate masks. More specifically, one half of the structures are formed using one of the masks. The other half of the structures then are formed using the other one of the masks in a manner that each of these structures is located between two previously formed structures. As such, the structures arranged densely in parallel can be formed by less densely arranged patterns on the masks, wherein the pitch of which is twice of the pitch of the structures to be formed.

SUMMARY

This disclosure provides a method for generating masks for manufacturing of a semiconductor structure, wherein the masks can be used in a manufacturing method applying double patterning technology. The method may also be referred to as a mask generation method in the disclosure.

According to some embodiments, a method for generating masks for manufacturing of a semiconductor structure comprises the following steps. First, a design pattern is provided to a processor. The design pattern comprises patterns arranged in parallel. The patterns comprise at least one first pattern having a first length and at least two second pattern having a second length shorter than the first length, wherein two of the second patterns are arranged in a line along an extending direction of the patterns. Then, the second patterns are elongated by the processor such that the second patterns have a third length longer than the second length and the two second patterns arranged in the line are separated from each other by a distance equal to a minimum space of the design pattern. The design pattern is divided into a first set of patterns and a second set of patterns by the processor. A first mask is generated by the processor based on the first set of patterns. A second mask is generated by the processor based on the second set of patterns.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Various embodiments will be described more fully hereinafter with reference to accompanying drawings. For clarity, the components in the figures may not be drawn to scale. It is contemplated that elements and features of one embodiment may be beneficially incorporated in another embodiment without further recitation.

Figure 1:
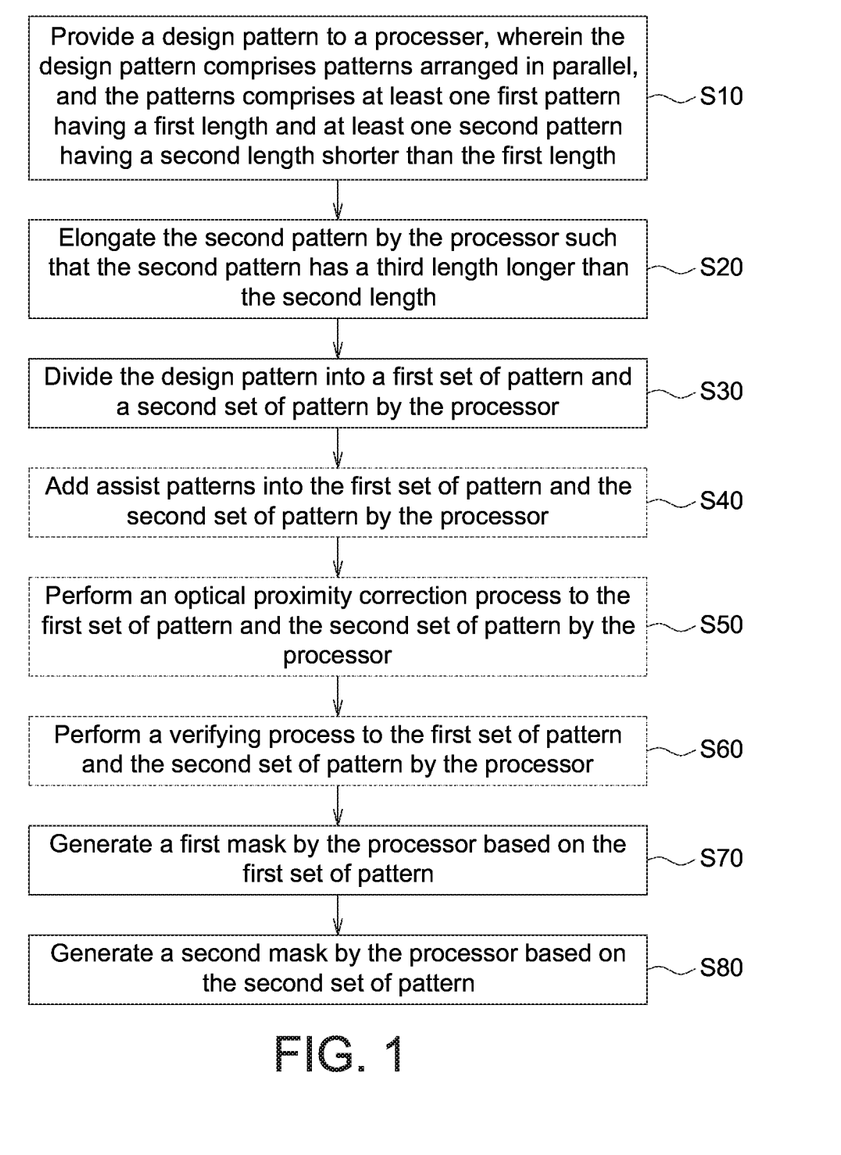
FIG. 1 shows the flow diagram of an exemplary method for generating masks for manufacturing of a semiconductor structure according to embodiments.

Referring to FIG. 1, the flow diagram of an exemplary method for generating masks for manufacturing of a semiconductor structure according to embodiments is shown. It is contemplated that the steps described herein may be exchanged, combined, and/or modified at any other suitable manner, while it is needed.

In step S10, a design pattern is provided to a processor. The design pattern comprises patterns arranged in parallel, and the patterns comprise at least one first pattern having a first length and at least one second pattern having a second length shorter than the first length. In some embodiments, the design pattern may have a first area and a second area, wherein the first area comprises both the first pattern and the second pattern, and the second area comprises the first pattern but does not comprise the second pattern.

In step S20, the second pattern is elongated by the processor such that the second pattern has a third length longer than the second length. In some embodiments, the second pattern is elongated from the first area toward and into the second area. In some embodiments, the elongated second pattern and another pattern arranged adjacent to the elongated second pattern in a line along an extending direction of the patterns are separated from each other by a distance equal to a minimum space of the design pattern.

In step S30, the design pattern is divided into a first set of patterns and a second set of patterns by the processor. The division being performed after the elongation of the second pattern, as in FIG. 1, is beneficial for a simpler and more implementable division of the design pattern, and thereby the configuration of the structures formed by a lithography process applying this sequence can be improved. However, in some embodiments, the division may be performed before the elongation of the second pattern. There is no particular limitation.

Before the masks are generated, some optional steps may be performed. For example, in FIG. 1, optional steps S40, S50, and S60 are shown. In the step S40, add assist patterns (including the cases of sub-resolution assist feature patterns) are added into the first set of patterns and the second set of patterns by the processor. In the step S50, an optical proximity correction (OPC) process is performed to the first set of patterns and the second set of patterns by the processor. In the step S60, a verifying process is performed to the first set of patterns and the second set of patterns by the processor. It is understood that these steps may be all performed or partially performed and other suitable processes may also be performed as needed.

In step S70, a first mask is generated by the processor based on the first set of patterns. In step S80, a second mask is generated by the processor based on the second set of patterns.

Now referring to FIGS. 2A-2E, for a more clear understanding of the mask generation method described above, an exemplary design pattern at various stages of the mask generation method and the masks generated by the method are shown. The exemplary design pattern and the masks illustrated herein may be only portions of a more complicate design pattern and its corresponding masks, respectively.

Figure 2A:
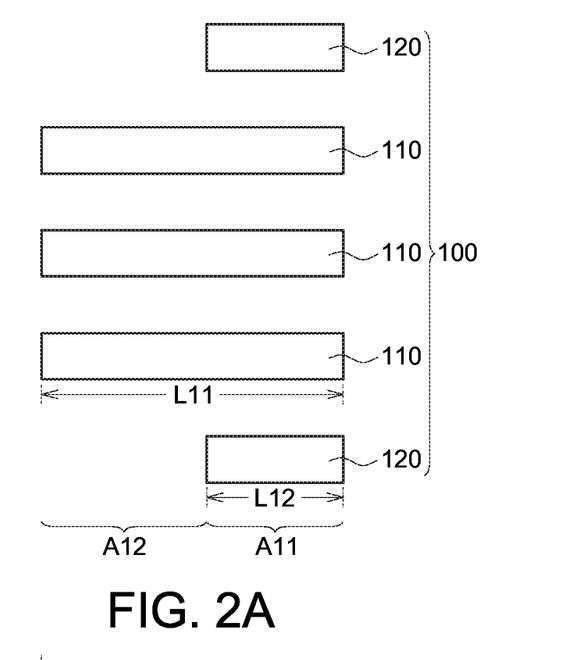
FIGS. 2A-2E show various stages of an exemplary design pattern during a mask generation method according to embodiments and the masks generated thereby.

FIG. 2A shows a design pattern 100 originally provided to the processor. This design pattern 100 comprises patterns arranged in parallel. The patterns comprise at least one first pattern 110 and at least one second pattern 120. In the drawings, three first patterns 110 and two second patterns 120 are exemplarily illustrated. The first patterns 110 have a first length L11. The second patterns 120 have a second length L12 shorter than the first length L11. The design pattern 100 shown in FIG. 2A has a first area A11 and a second area A12. The first area A11 comprises both the first patterns 110 and the second patterns 120. The second area A12 comprises the first patterns 110 but does not comprise any second pattern 120.

Figure 2B:
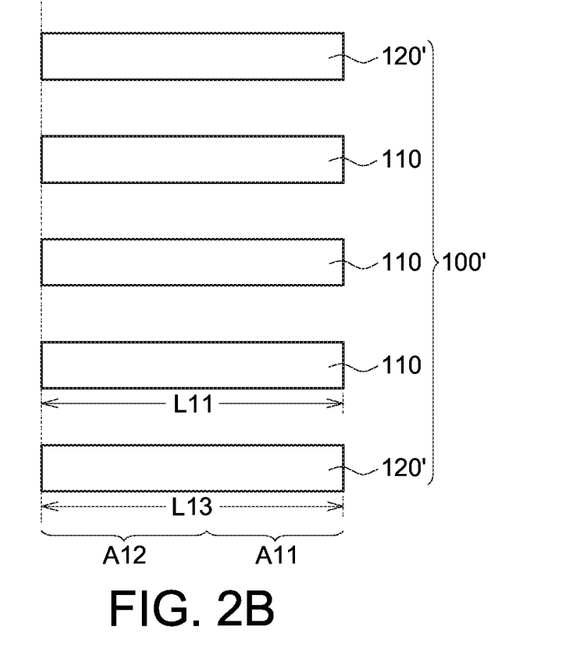

FIG. 2B shows that the second patterns 120 have been elongated to form revised second patterns 120' and a revised design pattern 100'. After the elongation from the first area A11 toward and into the second area A12 by the processor (not shown), the second patterns 120 have a third length L13 longer than the original second length L12. In this example, the third length L13 may be equal to the first length L11, as shown in FIG. 2B.

Figure 2C:
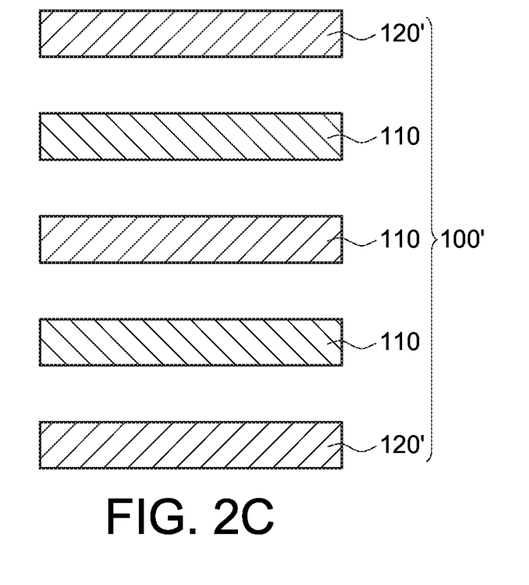

FIG. 2C shows that the design pattern 100' has been divided into a first set of patterns indicated by slash shading "///" and a second set of patterns indicated by backslash shading "\\\". As shown in FIG. 2C, any two adjacent patterns are divided into different sets. For example, a revised second pattern 120' is arranged into the first set of patterns, the first pattern 110 just adjacent to the revised second pattern 120' is arranged into the second set of patterns, and the next first pattern 110 (i.e., the one at the side of the previously described first pattern 110 opposite to the revised second pattern 120') is arranged into the first set of patterns again.

Figure 2D:
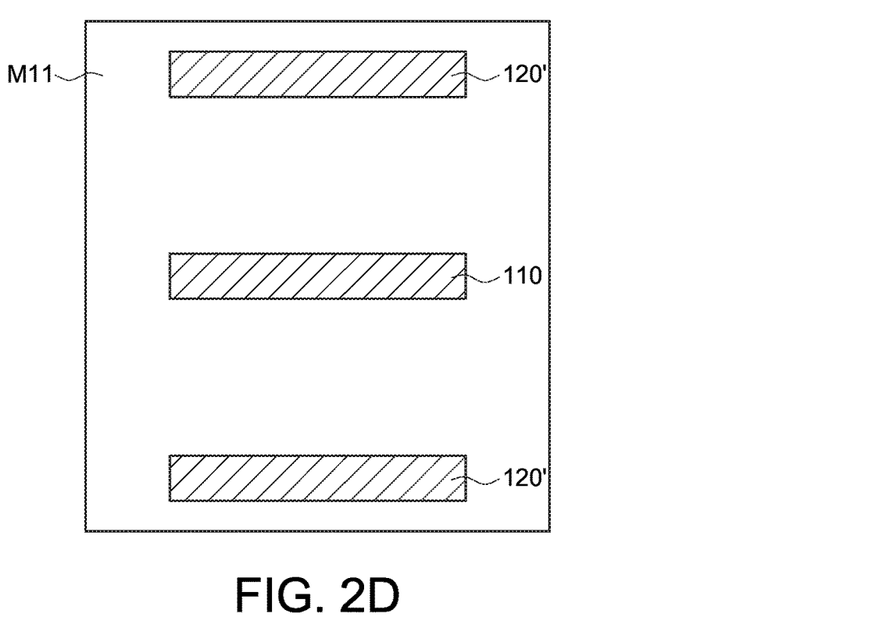
Figure 2E:
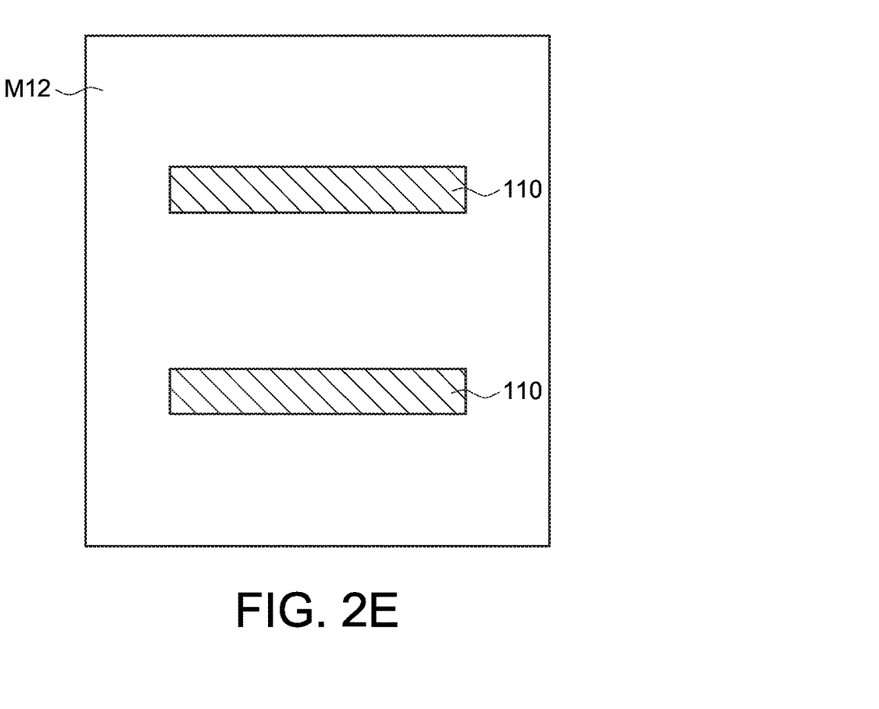

FIG. 2D and FIG. 2E show a first mask M11 and a second mask M12 generated based on the divided design pattern 100'. The first mask M11 comprises the middle first pattern 110 and the two revised second patterns 120', which are belong to the first set of patterns. The second mask M12 comprises the other two first patterns 110, which are belong to the second set of patterns.

Referring to FIGS. 3A-3E, another exemplary design pattern at various stages of the mask generation method and the masks generated by the method are shown. The exemplary design pattern and the masks illustrated herein may be only portions of a more complicate design pattern and its corresponding masks, respectively.

Figure 3A:
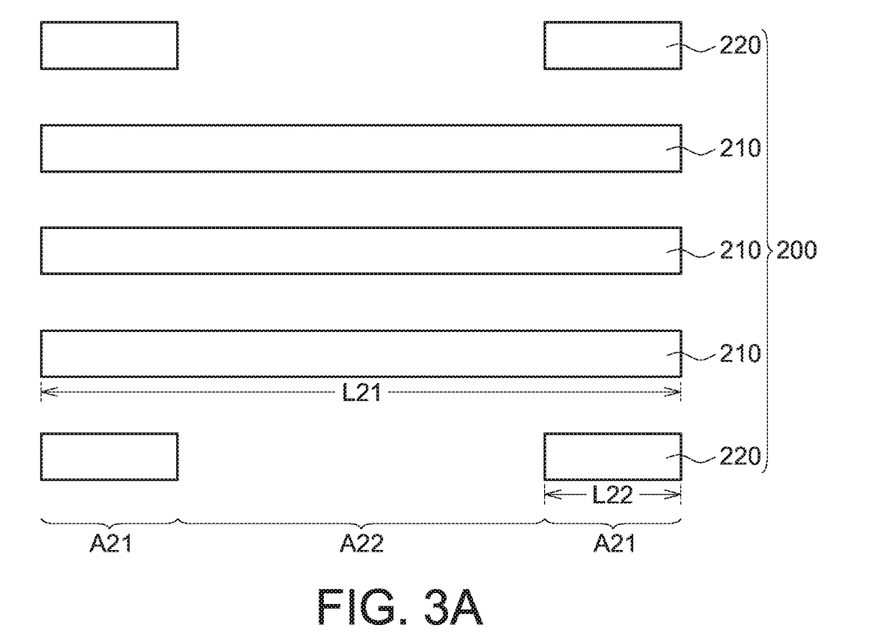
FIGS. 3A-3E show various stages of another exemplary design pattern during a mask generation method according to embodiments and the masks generated thereby.

FIG. 3A shows a design pattern 200 originally provided to the processor. This design pattern 200 comprises patterns arranged in parallel. The patterns comprise at least one first pattern 210 and at least one second pattern 220. In the drawings, three first patterns 210 and four second patterns 220 are exemplarily illustrated. In this example, two second patterns 220 are arranged in a line along an extending direction of the at least one second pattern 220, and separated from each other. The first patterns 210 have a first length L21. The second patterns 220 have a second length L22 shorter than the first length L21. The design pattern 200 shown in FIG. 2A has two first areas A21 and a second area A22. The first areas A21 comprise both the first patterns 210 and the second patterns 220. The second area A22 comprises the first patterns 210 but does not comprise any second pattern 220.

Figure 3B:
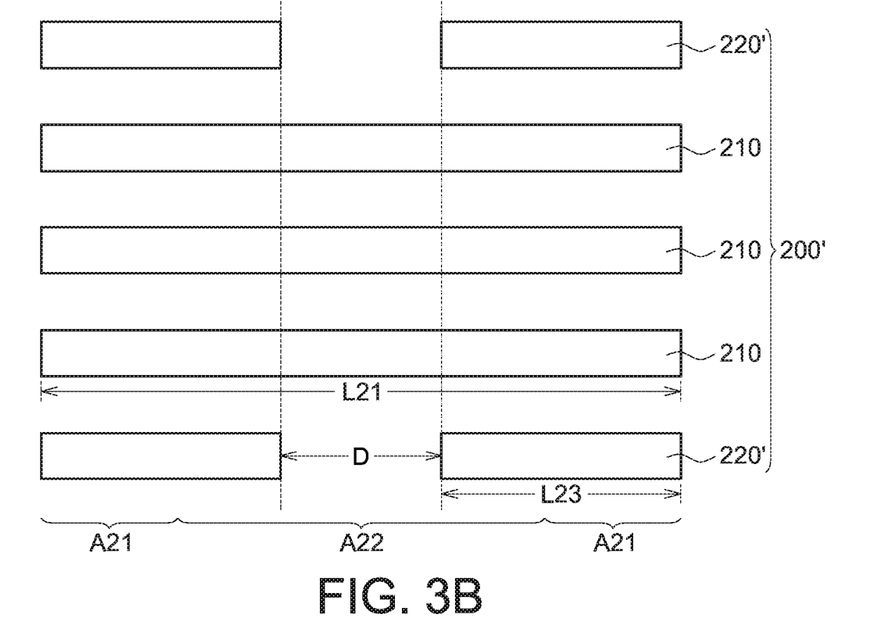

FIG. 3B shows that the second patterns 220 have been elongated to form revised second patterns 220' and a revised design pattern 200'. After the elongation from the first area A21 toward and into the second area A22 by the processor (not shown), the second patterns 220 have a third length L23 longer than the original second length L22. In this example, even after the elongation, the two second patterns 220' arranged in a line are separated from each other. The two second patterns 220' are separated from each other by a distance D equal to or larger than a minimum space of the design pattern. In some embodiments, a distance D equal minimum space of the design pattern is desired. The third length L23 may be smaller than half of the first length L21, as shown in FIG. 3B.

Figure 3C:
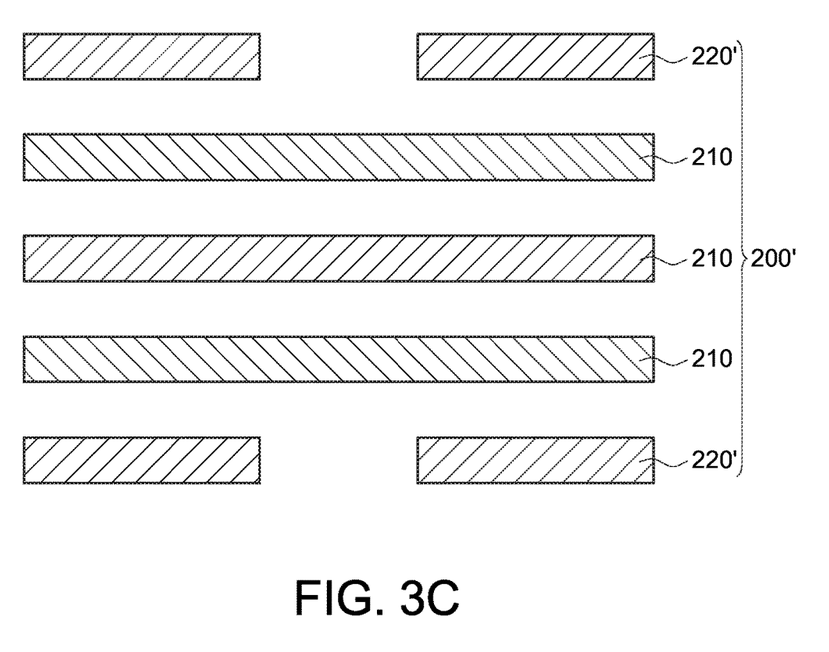

FIG. 3C shows that the design pattern 200' has been divided into a first set of patterns indicated by slash shading "///" and a second set of patterns indicated by backslash shading "\\\". As shown in FIG. 3C, any two adjacent patterns are divided into different sets. For example, two revised second pattern 220' arranged in a line are arranged into the first set of patterns, the first pattern 210 just adjacent to the revised second patterns 220' is arranged into the second set of patterns, and the next first pattern 210 (i.e., the one at the side of the previously described first pattern 210 opposite to the revised second patterns 220') is arranged into the first set of patterns again.

Figure 3D:
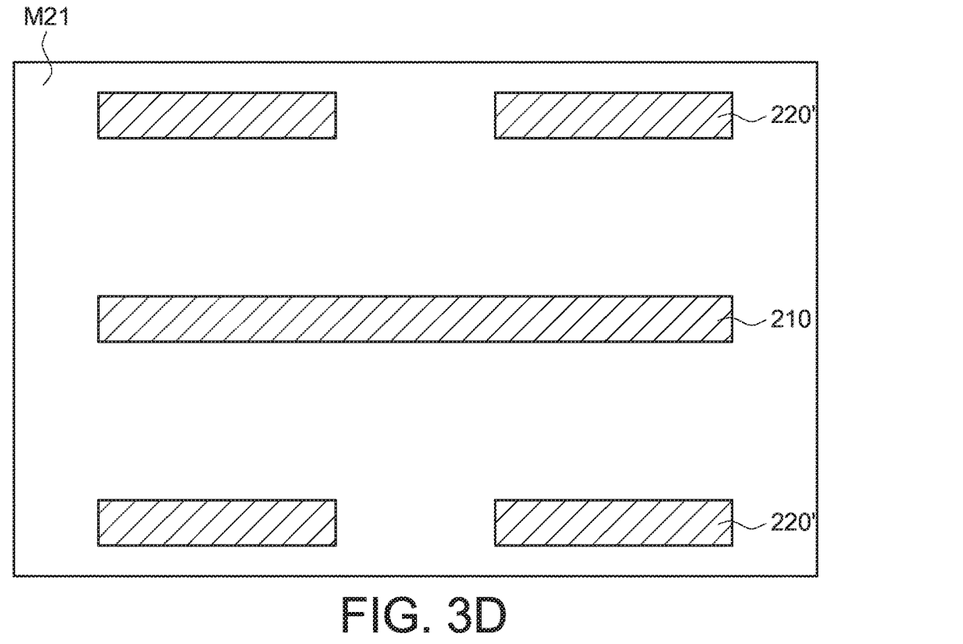
Figure 3E:
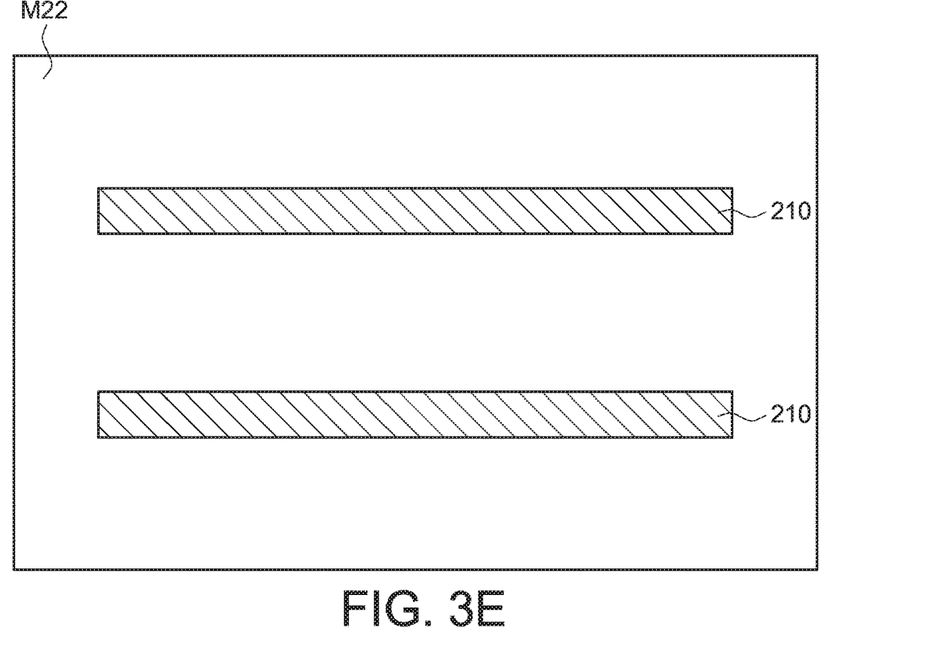

FIG. 3D and FIG. 3E show a first mask M21 and a second mask M22 generated based on the divided design pattern 200'. The first mask M21 comprises the middle first pattern 210 and the four revised second patterns 220', which are belong to the first set of patterns. The second mask M22 comprises the other two first patterns 210, which are belong to the second set of patterns.

As described above, the design pattern and masks illustrated in FIGS. 2A-2E may be only portions of a more complicated design pattern and its corresponding masks, so as the design pattern and masks illustrated in FIGS. 3A-3E. As such, in some embodiments, the design pattern illustrated in FIGS. 2A-2E and the design pattern illustrated in FIGS. 3A-3E may be separate portions of a complete design pattern, and the masks illustrated in FIGS. 2A-2E and the masks illustrated in FIGS. 3A-3E may be separate portions of corresponding complete masks. However, the disclosure is not limited thereto. In some other embodiments, the design pattern illustrated in FIGS. 2A-2E and the design pattern illustrated in FIGS. 3A-3E may belong to different complete design patterns, and the masks illustrated in FIGS. 2A-2E and the masks illustrated in FIGS. 3A-3E may belong to different pairs of masks.

While the forgoing embodiments illustrate patterns are completely arranged in a parallel manner, they may comprise non-parallel portions or other configuration outside the concerned areas shown in the drawings.

The elongated portion of the second pattern can provide the function of assist feature patterns, which is beneficial for the process window for the structure formed by the first pattern. This is particularly useful in a situation that only one first pattern is arranged in a concerned area (A12/A22) of a mask.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for generating masks for manufacturing of a semiconductor structure, comprising:
    providing a design pattern to a processor, wherein the design pattern comprises patterns arranged in parallel, and the patterns comprise:
        at least one first pattern having a first length; and
        at least two second patterns having a second length shorter than the first length, wherein two of the second patterns are arranged in a line along an extending direction of the patterns;
    elongating the second patterns by the processor such that the second patterns have a third length longer than the second length and the two second patterns arranged in the line are separated from each other by a distance equal to a minimum space of the design pattern;
    dividing the design pattern into a first set of patterns and a second set of patterns by the processor;
    generating a first mask by the processor based on the first set of patterns; and
    generating a second mask by the processor based on the second set of patterns.

2. The method according to claim 1, wherein in providing the design pattern to the processor, the design pattern has a first area and a second area, the first area comprises both the first pattern and the second pattern, and the second area comprises the first pattern but does not comprise the second pattern, and wherein in elongating the second pattern by the processor, the second pattern is elongated from the first area toward and into the second area.

3. The method according to claim 1, wherein in elongating the second pattern by the processor, the third length is shorter than half of the first length.

4. The method according to claim 1, wherein dividing the design pattern is performed after elongating the second pattern.

5. The method according to claim 1, wherein before generating the first mask and generating the second mask, add assist patterns into the first set of patterns and the second set of patterns by the processor.

6. The method according to claim 1, wherein before generating the first mask and generating the second mask, perform an optical proximity correction process to the first set of patterns and the second set of patterns by the processor.

7. The method according to claim 1, wherein before generating the first mask and generating the second mask, perform a verifying process to the first set of patterns and the second set of patterns by the processor.

* * * * *